United States Patent
Shirauchi (10) Patent No.: US 11,072,362 B2
(45) Date of Patent: Jul. 27, 2021

(54) VEHICLE STEERING SYSTEM

(71) Applicant: JTEKT CORPORATION, Osaka (JP)

(72) Inventor: Yousuke Shirauchi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 255 days.

(21) Appl. No.: 16/377,295

(22) Filed: Apr. 8, 2019

(65) Prior Publication Data
US 2019/0315390 A1   Oct. 17, 2019

(30) Foreign Application Priority Data

Apr. 12, 2018 (JP) .............................. JP2018-077062

(51) Int. Cl.
*B62D 5/04* (2006.01)

(52) U.S. Cl.
CPC ......... *B62D 5/0424* (2013.01); *B62D 5/0406* (2013.01); *B62D 5/0448* (2013.01)

(58) Field of Classification Search
CPC .. B62D 5/0424; B62D 5/0406; B62D 5/0448; F02B 67/06
See application file for complete search history.

(56) References Cited

U.S. PATENT DOCUMENTS

| | | | | |
|---|---|---|---|---|
| 5,621,644 A * | 4/1997 | Carson | ...... | F01L 1/02 701/102 |
| 5,626,108 A * | 5/1997 | Kato | ...... | F02D 13/0215 123/90.15 |
| 5,715,779 A * | 2/1998 | Kato | ...... | F01L 1/34406 123/90.15 |
| 6,454,044 B1 * | 9/2002 | Menjak | ...... | B62D 5/0424 180/444 |
| 7,189,176 B2 * | 3/2007 | Sakaida | ...... | B62D 5/0424 474/148 |
| 8,862,325 B2 * | 10/2014 | Soos | ...... | B62D 15/0235 701/41 |
| 8,868,296 B2 * | 10/2014 | Pyo | ...... | B62D 6/00 701/41 |
| 8,884,775 B2 * | 11/2014 | Komamura | ...... | B29C 45/76 340/686.3 |

(Continued)

FOREIGN PATENT DOCUMENTS

JP   2018-024366 A   2/2018

*Primary Examiner* — Minnah L Seoh
*Assistant Examiner* — Michael R Stabley
(74) *Attorney, Agent, or Firm* — Oliff PLC (57) ABSTRACT

The vehicle steering system includes a rack shaft and a conversion mechanism that converts rotation of a rotating shaft of the motor into reciprocating motion of the rack shaft. The conversion mechanism includes a drive pulley that rotates with the rotating shaft, a driven pulley rotatable about an axis of the rack shaft and a toothed belt extending around the drive pulley and the driven pulley, and converts rotation of the rotating shaft into reciprocating motion of the rack shaft when rotation of the drive pulley is transmitted to the driven pulley via the toothed belt. The vehicle steering system further includes a determination circuit that determines tooth skipping that is a change in meshing position between the drive pulley and the toothed belt, and a calculation circuit that calculates an integrated value obtained by integrating a prescribed value indicating that tooth skipping is determined by the determination circuit.

12 Claims, 5 Drawing Sheets

(56) References Cited

U.S. PATENT DOCUMENTS

| | | | |
|---|---|---|---|
| 9,314,835 B2* | 4/2016 | Kitamura | B62D 5/0448 |
| 9,464,697 B2* | 10/2016 | Antchak | F16H 7/12 |
| 2007/0256883 A1* | 11/2007 | Budaker | B62D 5/0448 |
| | | | 180/400 |
| 2014/0027196 A1* | 1/2014 | Kaneko | B62D 5/0448 |
| | | | 180/444 |
| 2014/0034410 A1* | 2/2014 | Jackson | B62D 3/12 |
| | | | 180/444 |
| 2015/0041241 A1* | 2/2015 | Yoshikawa | B62D 5/0409 |
| | | | 180/444 |
| 2016/0207560 A1* | 7/2016 | Muto | F16H 25/2204 |
| 2017/0008555 A1* | 1/2017 | Kitamura | F16H 25/2214 |
| 2017/0349205 A1* | 12/2017 | Kaneko | B62D 5/0448 |
| 2018/0043927 A1 | 2/2018 | Asakura et al. | |

* cited by examiner

VEHICLE STEERING SYSTEM

INCORPORATION BY REFERENCE

The disclosure of Japanese Patent Application No. 2018-077062 filed on Apr. 12, 2018 including the specification, drawings and abstract, is incorporated herein by reference in its entirety.

BACKGROUND OF THE INVENTION

1. Field of the Invention

The present invention relates to a vehicle steering system.

2. Description of Related Art

An electric power steering system disclosed in Japanese Patent Application Publication No. 2018-24366 (JP 2018-24366 A) is known as an example of a vehicle steering system. A conversion mechanism of the electric power steering system of JP 2018-24366 A includes a drive pulley that rotates with a rotating shaft of a motor, a driven pulley rotatable about the axis of a rack shaft, and a toothed belt extending around the drive pulley and the driven pulley. Teeth are provided on the outer peripheral surfaces of the drive pulley and the driven pulley and mesh with teeth of the toothed belt.

In the electric power steering system described above, a rack end of the rack shaft hits the inner wall of an end of a housing accommodating the rack shaft at high speed. The act of a rack end hitting the inner wall of an end of a housing is called end abutment. In the electric power steering system described above, end abutment often occurs when the rack shaft is moving at high speed.

When end abutment occurs, the rack shaft suddenly stops reciprocating motion, so that the driven pulley and the toothed belt are suppressed from rotating. Meanwhile, the rotating shaft of the motor and the drive pulley attempt to continue rotating due to inertia. Therefore, a stretched part resulting from tension increased by rotation of the drive pulley and a slack part resulting from reduced tension are formed in the toothed belt. As a result, the teeth of the drive pulley and the teeth of the slack part of the toothed belt may be disengaged, resulting in tooth skipping, which is a change in the meshing position between the teeth of the drive pulley and the teeth of the toothed belt.

If tooth skipping repeatedly occurs, deterioration of the conversion mechanism is likely to occur, such as wear between teeth upon re-engagement of the teeth of the drive pulley and the teeth of the toothed belt, wear between the teeth of the stretched part of the toothed belt resulting from rotation of the rotating shaft of the motor and the drive pulley and the teeth of the drive pulley, or reduction in durability of the toothed belt due to repeated increase in tension at the stretched part of the toothed belt.

SUMMARY OF THE INVENTION

An object of the present invention is to provide a vehicle steering system capable of estimating the degree of deterioration of a conversion mechanism.

According to an aspect of the present invention, there is provided a vehicle steering system including: a steered shaft that reciprocates in an axial direction to steer steered wheels; a motor that generates power for reciprocating the steered shaft; a conversion mechanism that converts rotation of a rotating shaft of the motor into reciprocating motion of the steered shaft; a control circuit that controls power supply to the motor; a determination circuit; and a calculation circuit, wherein:

the conversion mechanism includes a drive pulley that rotates with the rotating shaft, a driven pulley rotatable about an axis of the steered shaft, and a toothed belt extending around the drive pulley and the driven pulley, and converts rotation of the rotating shaft into reciprocating motion of the steered shaft when rotation of the drive pulley is transmitted to the driven pulley via the toothed belt;

the determination circuit determines tooth skipping that is a change in meshing position between the drive pulley and the toothed belt; and the calculation circuit calculates an integrated value obtained by integrating a prescribed value indicating that tooth skipping is determined by the determination circuit.

When tooth skipping between the drive pulley and the toothed belt in the conversion mechanism occurs, damage is accumulated in the conversion mechanism. According to the above aspect, the integrated value of the prescribed value can be calculated as the index value for the degree of deterioration of the conversion mechanism. Therefore, the degree of deterioration of the conversion mechanism can be estimated.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
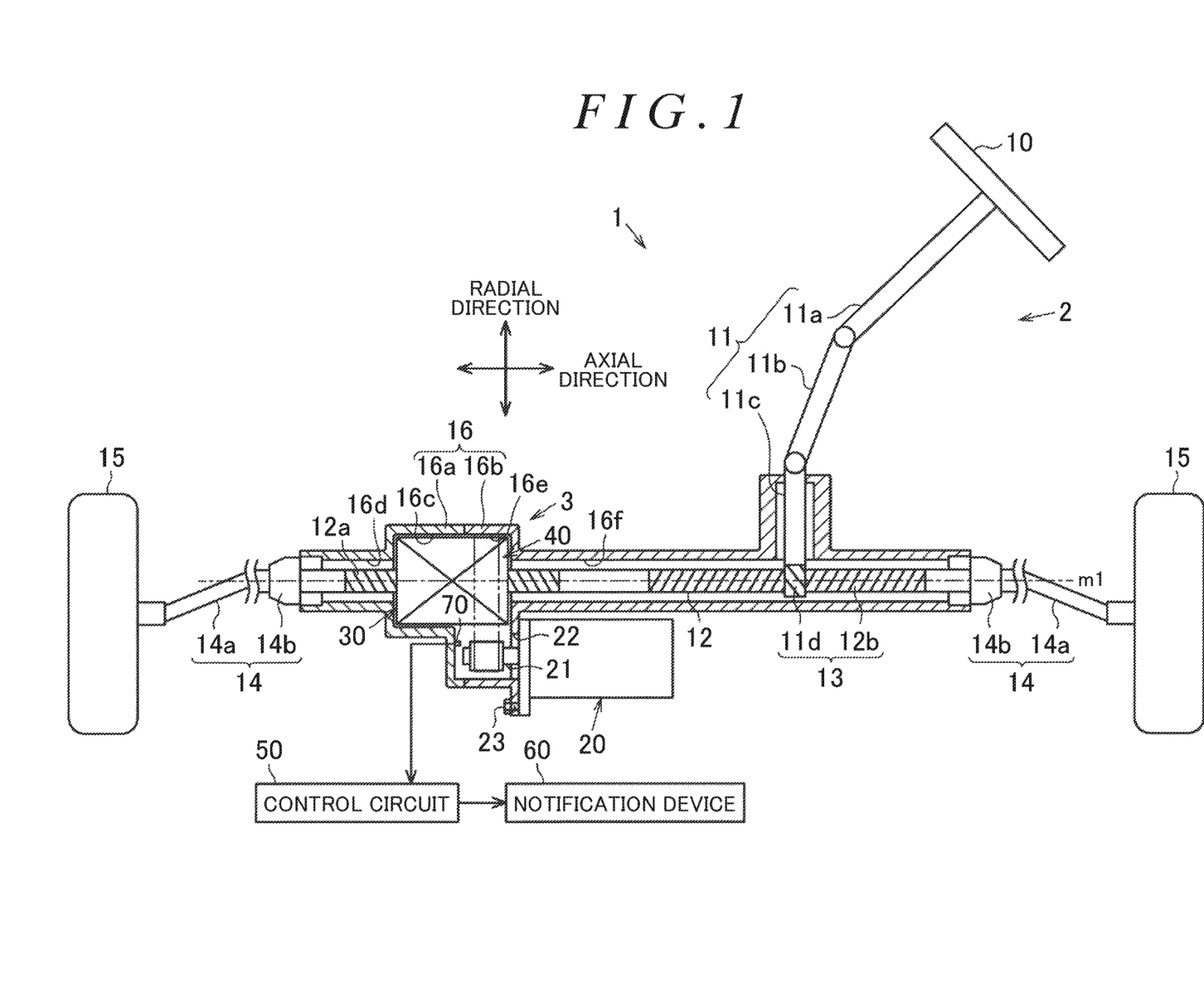
FIG. 1 is a schematic view illustrating a vehicle steering system according to an embodiment.

Hereinafter, an electric power steering system 1 (hereinafter referred to as an "EPS system 1") as an embodiment of a vehicle steering system of the present invention will be described. As illustrated in FIG. 1, the EPS system 1 includes a steering mechanism 2 that steers steered wheels 15 in accordance with operations of a steering wheel 10 by the driver, an assist mechanism 3 that assists the driver in steering the steering wheel 10, and a housing 16 that accommodates a part of the steering mechanism 2 and a part of the assist mechanism 3.

The steering mechanism 2 includes a steering shaft 11 that rotates with the steering wheel 10, and a rack shaft 12 as a steered shaft that reciprocates in the axial direction in accordance with operations of the steering wheel 10. The rack shaft 12 has a screw groove 12a (on the left in FIG. 1) and rack teeth 12b (on the right in FIG. 1) on the outer peripheral surface.

In the following description, the "axial direction" refers to the axial direction of the rack shaft 12; the "radial direction" refers to the direction orthogonal to the axial direction; and the circumferential direction refers to the circumferential direction about the axis of the rack shaft 12.

The steering shaft 11 includes a column shaft 11a coupled to the steering wheel 10, an intermediate shaft 11b coupled to the lower end of the column shaft 11a, and a pinion shaft 11c coupled to the lower end of the intermediate shaft 11b. Pinion teeth 11d are provided at the lower end of the pinion shaft 11c.

The pinion teeth 11d of the pinion shaft 11c and the rack teeth 12b of the rack shaft 12 that mesh with the pinion teeth 11d form a rack-and-pinion mechanism 13. Accordingly, rotary motion of the steering shaft 11 is converted into reciprocating motion of the rack shaft 12 in the axial direction via the rack-and-pinion mechanism 13. The reciprocating motion of the rack shaft 12 is transmitted to the right and left steered wheels 15 via inner ball joints 14 (hereinafter referred to as "IBJs 14") coupled to the respective ends of the rack shaft 12, so that the steered angle of the steered wheels 15 is changed. Each IBJ 14 includes a tie rod 14a and a socket 14b. The tie rod 14a is attached at an angle with respect to an axis m1 of the rack shaft 12. The reciprocating motion of the rack shaft 12 in the axial direction is restricted by so-called end abutment in which the socket 14b hits the inner wall of an end of the housing 16. That is, the stroke end as the movement limit of the rack shaft 12 is determined by the socket 14b hitting the inner wall of the housing 16 in the axial direction. Note that the socket 14b of the IBJ 14 is the rack end of the rack shaft 12.

The assist mechanism 3 includes a motor 20 that generates power for reciprocating the rack shaft 12, a ball screw mechanism 30 that converts rotation of a rotating shaft 21 of the motor 20 into reciprocating motion of the rack shaft 12, and a belt-type transmission mechanism 40 that transmits the power of the motor 20 to the ball screw mechanism 30. That is, the assist mechanism 3 converts the rotational force of the rotating shaft 21 into an axial force along the axis m1 for reciprocating the rack shaft 12 in the axial direction via the ball screw mechanism 30 and the transmission mechanism 40, and uses the axial force applied to the rack shaft 12 as an assist force to assist the driver in operating the steering wheel 10. Note that the ball screw mechanism 30 and the transmission mechanism 40 are an example of a conversion mechanism.

The housing 16 accommodates the rack shaft 12, the ball screw mechanism 30, the transmission mechanism 40, and a part of the pinion shaft 11c. The housing 16 is formed by coupling a first housing 16a and a second housing 16b that are divided in the axial direction. The first housing 16a includes a first accommodating portion 16c accommodating the assist mechanism 3, and a first cylindrical portion 16d communicating with the first accommodating portion 16c and extending on the side opposite to the rack-and-pinion mechanism 13. The second housing 16b includes a second accommodating portion 16e accommodating the assist mechanism 3, and a second cylindrical portion 16f communicating with the second accommodating portion 16e and extending on the rack-and-pinion mechanism 13 side. The rack shaft 12 is accommodated in the first accommodating portion 16c, the first cylindrical portion 16d, the second accommodating portion 16e, and the second cylindrical portion 16f.

A through hole 22 is provided in the outer wall (right wall in FIG. 1) of the second accommodating portion 16e of the second housing 16b. The rotating shaft 21 of the motor 20 is accommodated in the second housing 16b via the through hole 22. The motor 20 is fixed to the second housing 16b by a bolt 23. The rotating shaft 21 is parallel to the rack shaft 12.

Figure 2:
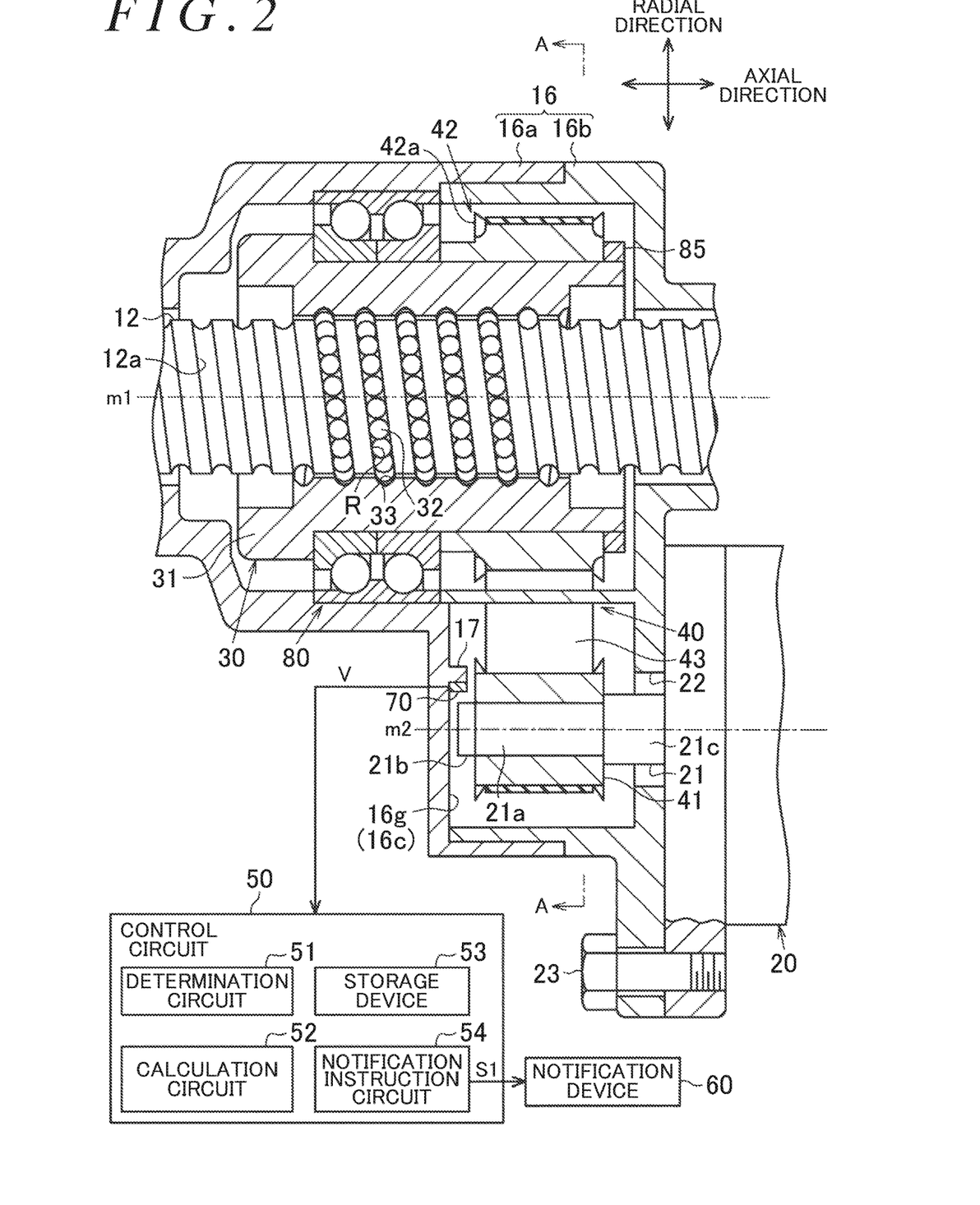
FIG. 2 is a cross-sectional view illustrating an assist mechanism of the vehicle steering system.

As illustrated in FIG. 2, the ball screw mechanism 30 includes a cylindrical ball screw nut 31 that is threaded on the outer periphery of the rack shaft 12 via a plurality of balls 32. The axis of the ball screw nut 31 coincides with the axis m1 of the rack shaft 12. A helical screw groove 33 corresponding to the screw groove 12a of the rack shaft 12 is provided on the inner peripheral surface of the ball screw nut 31. The helical space enclosed by the screw groove 33 of the ball screw nut 31 and the screw groove 12a of the rack shaft 12 serves as a rolling path R in which the balls 32 roll. The ball screw nut 31 has a circulation path (not illustrated) having two openings in the rolling path R and short-circuiting between the two openings. Therefore, the plurality of balls 32 can endlessly circulate in the rolling path R via the circulation path inside the ball screw nut 31. A bearing 80 is provided between the outer peripheral surface of the ball screw nut 31 and the inner peripheral surface of the first housing 16a. The bearing 80 is a double-row angular ball bearing. The bearing 80 rotatably supports the ball screw nut 31.

The transmission mechanism 40 includes a cylindrical drive pulley 41 that rotates with the rotating shaft 21, a cylindrical driven pulley 42 rotatable about the axis m1 of the rack shaft 12, and a toothed belt 43 extending around the drive pulley 41 and the driven pulley 42. Helical teeth are provided on the outer peripheral surfaces of the drive pulley 41 and the driven pulley 42 and the inner peripheral surface of the toothed belt 43. Therefore, the helical teeth of the drive pulley 41 and the helical teeth of the toothed belt 43 mesh with each other, and the helical teeth of the driven pulley 42 and the helical teeth of the toothed belt 43 mesh with each other, thereby forming the transmission mechanism 40. Note that the helical teeth are teeth inclined at an angle with respect to the axis of each component of the transmission mechanism 40.

A first end 21a (a left end in FIG. 2) as the distal end of the rotating shaft 21 is inserted into the drive pulley 41. The first end 21a extends through the drive pulley 41. A projection 21b of the first end 21a extending through the drive pulley 41 faces the inner wall surface of the housing 16, that is, an inner wall surface 16g of the first accommodating portion 16c of the first housing 16a, in a direction along an axis m2 of the rotating shaft 21. Note that the motor 20 is fixed to the second housing 16b by the bolt 23. Therefore, the rotating shaft 21 has a cantilever structure in which a second end 21c (right end in FIG. 2) as the proximal end of the rotating shaft 21 opposite to the first end 21a is a fixed end and the first end 21a of the rotating shaft 21 is a free end.

The driven pulley 42 is provided on the outer peripheral surface of the ball screw nut 31 so as to be adjacent to an inner ring of the bearing 80 in the axial direction. A lock nut 85 is threaded on the outer peripheral surface of the ball screw nut 31 on the side opposite to the bearing 80 with respect to the driven pulley 42. The lock nut 85 has a function of fixing the driven pulley 42 between the bearing 80 and the lock nut 85 on the outer peripheral surface of the ball screw nut 31. Therefore, the driven pulley 42 can rotate with the ball screw nut 31.

In the assist mechanism 3 having the configuration described above, when the rotating shaft 21 of the motor 20 rotates, the drive pulley 41 rotates. The rotational force of the drive pulley 41 is transmitted to the driven pulley 42 via the toothed belt 43. The driven pulley 42 rotates about the axis m1 of the rack shaft 12 in accordance with the rotational force of the drive pulley 41. As the driven pulley 42 rotates, rotational torque is applied to the ball screw nut 31. The rotational torque is converted into an axial force for reciprocating the rack shaft 12 by the plurality of balls 32 between the inner peripheral surface of the ball screw nut 31 and the outer peripheral surface of the rack shaft 12. The axial force applied to the rack shaft 12 is used as an assist force to assist the driver in operating the steering wheel 10.

A receiving portion 17 projecting toward the second housing 16b along the axial direction is integrally provided on the inner wall surface 16g of the first housing 16a. The receiving portion 17 is disposed on the driven pulley 42 side with respect to the rotating shaft 21 to be adjacent to the projection 21b of the rotating shaft 21. A proximity sensor 70 is provided on the rotating shaft 21 side of the receiving portion 17. The proximity sensor 70 is, for example, an electrostatic sensor. A voltage value V of a signal output from the proximity sensor 70 increases as an object approaches. For example, assume the case where the rotating shaft 21 is inclined toward the driven pulley 42 at an angle with respect to the axis m2, as an example where the rotating shaft 21 is displaced toward the driven pulley 42. In this case, the receiving portion 17 and the proximity sensor 70 are disposed at positions where the projection 21b of the rotating shaft 21 does not abut the receiving portion 17 or the proximity sensor 70 even when the rotating shaft 21 is displaced toward the driven pulley 42 and where the voltage value V of the signal output from the proximity sensor 70 varies when the rotating shaft 21 is displaced.

The EPS system 1 includes a control circuit 50 that controls power supply to the motor 20, and determines tooth skipping between the drive pulley 41 and the toothed belt 43. The control circuit 50 calculates an assist amount based on various state quantities such as the steering torque detected by a torque sensor (not illustrated), the rotation angle of the rotating shaft 21 detected by a rotation angle sensor of the motor 20, and the vehicle speed detected by a vehicle speed sensor, and controls power supply to the motor 20 based on the assist amount.

In the following, determination of tooth skipping by the control circuit 50 will be described. Tooth skipping is a change in the meshing position between the helical teeth of the drive pulley 41 and the helical teeth of the toothed belt 43. Tooth skipping is likely to occur when, for example, the socket 14b of the IBJ 14 hits the inner wall of an end of the housing 16 at high speed. In other words, tooth skipping is likely to occur when end abutment occurs while the rack shaft 12 is moving at high speed. Examples of a situation where end abutment occurs while the rack shaft 12 is moving at high speed may include situations such as when the steered wheel 15 goes over a curb on the road while the vehicle is travelling.

Figure 3:
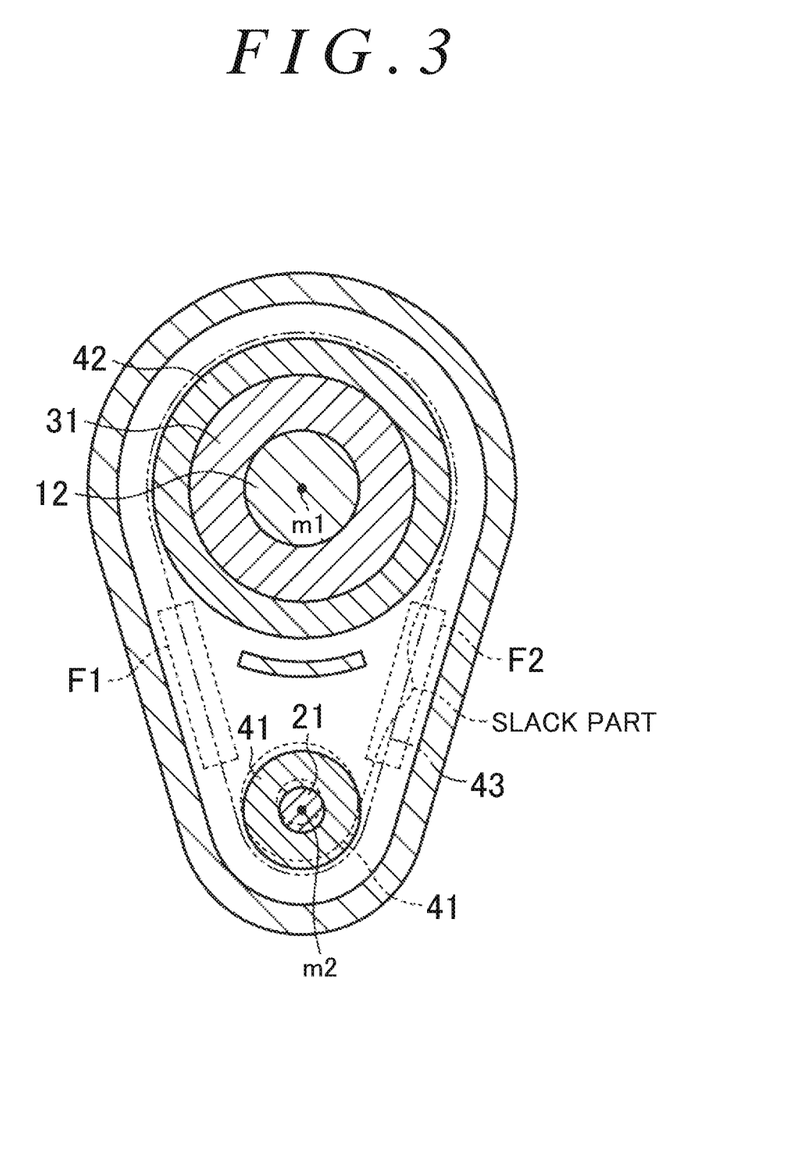
FIG. 3 is a cross-sectional view taken along line A-A in FIG. 2.

Consider the case where end abutment occurs while the rack shaft 12 is moving at high speed, and thus tooth skipping occurs as illustrated in FIG. 3. In this case, the rack shaft 12 is suppressed from reciprocating, so that the driven pulley 42 and the toothed belt 43 are suppressed from rotating. Meanwhile, the rotating shaft 21 and the drive pulley 41 attempt to continue rotating. Therefore, a stretched part F1 resulting from tension increased by rotation of the drive pulley 41 and a slack part F2 resulting from reduced tension are formed in the toothed belt 43. As a result, the helical teeth of the drive pulley 41 and the helical teeth of the slack part F2 of the toothed belt 43 may be disengaged, and thus tooth skipping may occur. Thus, the rotating shaft 21 may be displaced toward the driven pulley 42 via the drive pulley 41 due to the stretched part F1 of the toothed belt 43. That is, the rotating shaft 21 of the motor 20 is likely to be displaced toward the driven pulley 42 when tooth skipping occurs.

If tooth skipping repeatedly occurs, deterioration of the conversion mechanism is likely to occur, such as wear between teeth upon re-engagement of the helical teeth of the drive pulley 41 and the helical teeth of the toothed belt 43, wear between the helical teeth of the stretched part F1 of the toothed belt 43 resulting from rotation of the rotating shaft 21 of the motor 20 and the drive pulley 41 and the helical teeth of the drive pulley 41, or reduction in durability of the toothed belt 43 due to repeated increase in tension at the stretched part F1 of the toothed belt 43. Therefore, it is preferable to replace the toothed belt 43 in accordance with the degree of deterioration of the conversion mechanism.

Thus, as illustrated in FIG. 2, the control circuit 50 includes a determination circuit 51 that determines tooth skipping based on whether the voltage value V of the signal output from the proximity sensor 70 is greater than a threshold Vth, a calculation circuit 52 that calculates an integrated value Sam obtained by integrating a prescribed value Sv, which is a fixed value indicating the number of times tooth skipping is determined by the determination circuit 51, a storage device 53 having a non-volatile memory that stores the integrated value Sam calculated by the calculation circuit 52, and a notification instruction circuit 54 that instructs a notification device 60 mounted on the vehicle to notify that the integrated value Sam is greater than a predetermined threshold Sth. The storage device 53 can store information other than the integrated value Sam, such as the threshold Sth. The storage device 53 has a function of connecting to an external device of the EPS system 1 and transmitting stored information to the external device. For example, the storage device 53 transmits the integrated value Sam and the threshold Sth stored therein to the external device. Note that the notification device 60 is, for example, a warning light on the instrument panel in the vehicle.

The following describes the thresholds Vth and Sth. The threshold Vth is the maximum value of the voltage value V when the projection 21b is displaced toward the driven pulley 42, in particular, when the projection 21b has approached the proximity sensor 70 with no tooth skipping. That is, the determination circuit 51 determines, as noise, a change in the voltage value V due to a displacement of the rotating shaft 21 during use of the EPS system 1 in an environment where no tooth skipping occurs, and determines that no tooth skipping has occurred. A displacement of the rotating shaft 21 in an environment where no tooth skipping occurs is, for example, a displacement of the rotating shaft 21 in an environment where end abutment occurs in the course of a situation where the driver operates the steering wheel 10 to steer the steered wheels 15, or a displacement of the rotating shaft 21 due to vibrations transmitted via the steered wheels 15 from the road when the vehicle is traveling.

The threshold Sth is set for the integrated value Sam, and indicates the degree of deterioration of the conversion mechanism. The threshold Sth has a value less by a predetermined number of times than the number of times of tooth skipping assumed to cause a substantial decrease in the durability of the toothed belt 43. The reason for this is to cause the notification device 60 to prompt the driver to replace the toothed belt 43 before the durability of the toothed belt 43 substantially decreases.

Figure 4:
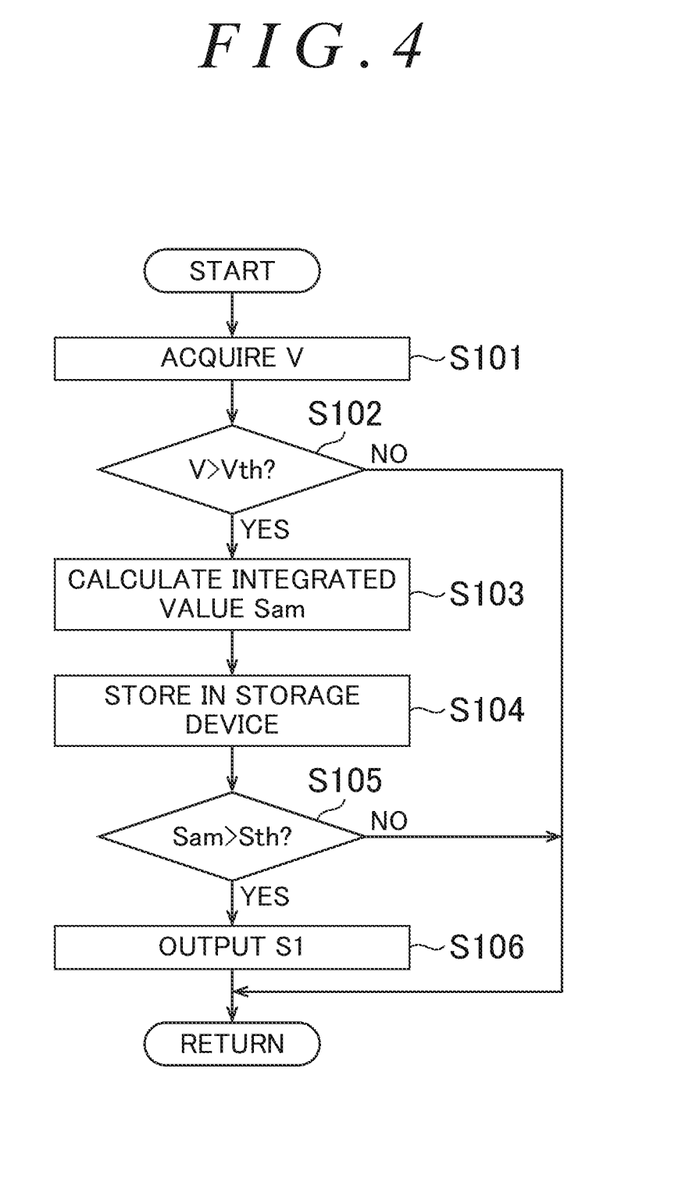
FIG. 4 is a control flow diagram of a control circuit of the vehicle steering system.

The control flow of the control circuit 50 will be described in detail. As illustrated in FIG. 4, the control circuit 50 acquires a signal output from the proximity sensor 70 at predetermined intervals (step S101). The control circuit 50 determines whether a voltage value V of the acquired signal is greater than the threshold Vth (step S102). When the voltage value V of the acquired signal is equal to or less than the threshold Vth, the control circuit 50 determines that no tooth skipping has occurred (NO in step S102), and the process ends (RETURN). When the voltage value V of the acquired signal is greater than the threshold Vth, the control circuit 50 determines that tooth skipping has occurred (YES in step S102), and causes the calculation circuit 52 to calculate the integrated value Sam (step S103). The control flow in step S101 and step S102 of the control circuit 50 corresponds to operations performed by the determination circuit 51.

The control circuit 50 integrates "1", which is the prescribed value Sv, each time occurrence of tooth skipping is determined by the determination circuit 51 (step S103). The prescribed value Sv being "1" indicates that occurrence of tooth skipping is determined one time by the determination circuit 51. Therefore, the integrated value Sam is the integrated count value indicating the number of times occurrence of tooth skipping is determined by the determination circuit 51. The control circuit 50 causes the storage device 53 to store the integrated value Sam each time the integrated value Sam is updated (step S104). After causing the storage device 53 to store the integrated value Sam, the control circuit 50 determines whether the integrated value Sam is greater than the predetermined threshold Sth (step S105). When the integrated value Sam is not greater than the threshold Sth (NO in step S105), the process ends (RETURN). When the integrated value Sam is greater than the threshold Sth (YES in step S105), the control circuit 50 outputs a command signal 51 for causing the notification device 60 to notify of deterioration of the conversion mechanism (toothed belt 43) to the notification device 60 (step S106), and the process ends (RETURN). The control circuit 50 repeats the control flow described above at predetermined intervals until the notification instruction circuit 54 outputs the instruction signal 51 to the notification device 60 in step S106. Note that steps S103, S104, and S105 of the control circuit 50 correspond to operations performed by the calculation circuit 52, and step S106 of the control circuit 50 corresponds to operations performed by the notification instruction circuit 54.

The advantageous effects of the present embodiment will be described.

(1) When tooth skipping occurs between the drive pulley 41 of the transmission mechanism 40 and the toothed belt 43, damage is accumulated in the toothed belt 43 (conversion mechanism). The integrated value Sam of the prescribed value Sv can be calculated as an index value for the degree of deterioration of the toothed belt 43 (conversion mechanism). Therefore, the degree of deterioration of the conversion mechanism can be estimated.

(2) Since damage to the toothed belt 43 (conversion mechanism) can be determined from the integrated value Sam of the prescribed value Sv, the degree of deterioration of the toothed belt 43 can be appropriately estimated.

(3) The threshold Sth that is set for the integrated value Sam and that indicates the degree of deterioration of the conversion mechanism is preset. Therefore, for example, when inspecting the vehicle at a dealer, the integrated value Sam may be compared with the threshold Sth to determine the degree of deterioration of the conversion mechanism.

(4) When the integrated value Sam of the prescribed value Sv becomes greater than the threshold Sth, the driver is notified of this fact and thus can easily recognize deterioration of the toothed belt 43 (conversion mechanism). This may prompt the driver to take measures such as taking the vehicle for a service at a dealer.

(5) The storage device 53 has a function of connecting to an external device of the EPS system 1 and transmitting stored information to the external device. Therefore, for example, when the vehicle is taken to a dealer, the degree of deterioration of the toothed belt 43 can be easily estimated by connecting to the storage device 53 to a diagnostic device for diagnosing the degree of deterioration of the toothed belt 43.

The present embodiment may be modified as described below. The present embodiment and the following modifications may be combined as long as no technical inconsistency arises. Although the drive pulley 41, the driven pulley 42, and the toothed belt 43 have helical teeth to mesh with each other, spur teeth may be used in place of the helical teeth. Spur teeth are teeth are teeth parallel to the axis of each component of the transmission mechanism 40.

In the present embodiment, although the calculation circuit 52 calculates the integrated value Sam each time the determination circuit 51 determines tooth skipping, the present invention is not limited thereto. For example, the calculation circuit 52 may calculate the integrated value Sam when the determination circuit 51 determines tooth skipping two times. The calculation circuit 52 does not have to calculate the integrated value Sam when tooth skipping is determined two times, and may calculate the integrated value Sam when tooth skipping is determined three times or more, or at any appropriate time.

In the present embodiment, determination of tooth skipping by the determination circuit 51 is made based on whether the voltage value V of the signal output from the proximity sensor 70 is greater than the threshold Vth. However, the present invention is not limited thereto. For instance, tooth skipping may be determined based on the rotational speed of the rotating shaft 21 and the rotational acceleration of the rotating shaft 21. In this case, the proximity sensor 70 is omitted, and a computation circuit that calculates the rotational speed and the rotational acceleration of the rotating shaft 21 from the rotation angle detected from the rotation angle sensor of the motor 20.

Determination of tooth skipping by the determination circuit 51 will be described in detail. The determination circuit 51 may determine tooth skipping when the number of times both the rotational speed and the rotational acceleration of the rotating shaft 21 of the motor 20 exceed thresholds respectively set for the rotational speed and the rotational acceleration becomes greater than a predetermined number of times. Tooth skipping is likely to occur when end abutment occurs while the rack shaft 12 is moving at high speed. Therefore, if the rotational speed and the rotational acceleration are somewhat high, it is possible to determine that the rack shaft 12 is moving at high speed, and thus to determine that tooth skipping occurs. The determination circuit 51 may use any determination method to determine tooth skipping as long as tooth skipping between the drive pulley 41 and the toothed belt 43 can be determined.

In the present embodiment, the prescribed value Sv is 1. However, the present invention is not limited thereto, and the prescribed value Sv may be a fixed value other than 0, such as 2 and 3. Even in this case, it is possible to check the number of times occurrence of tooth skipping is determined by the determination circuit 51.

Figure 5:
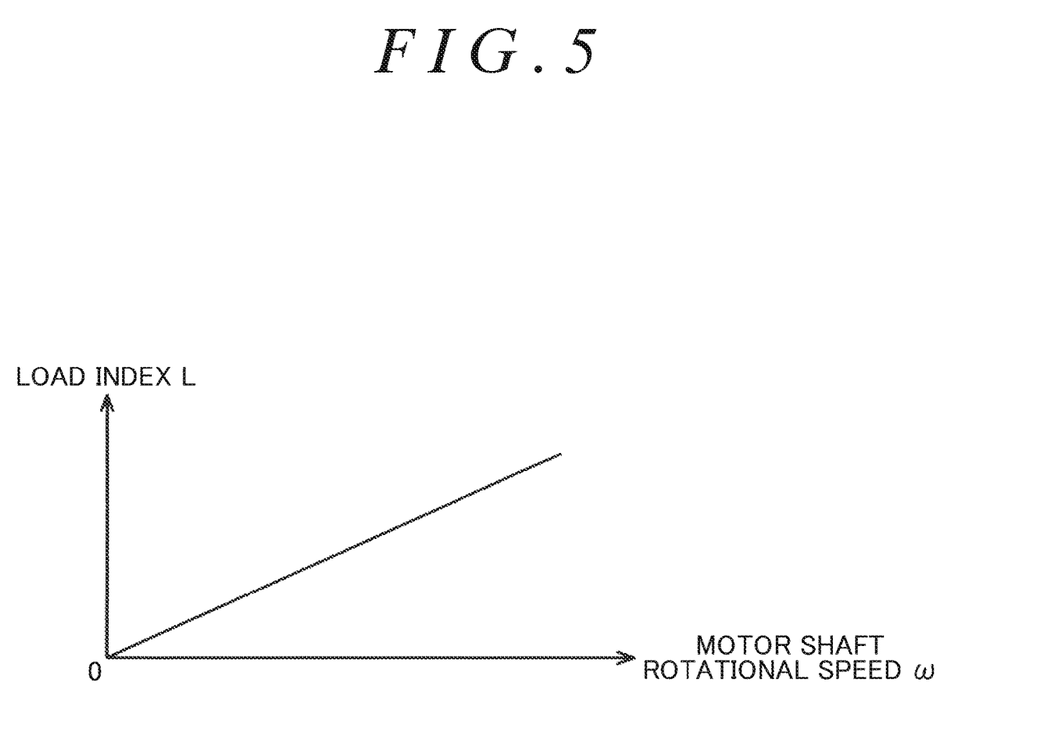
FIG. 5 is a map illustrating the relationship between a load index and a rotational speed according to a modification of the vehicle steering system.

In the present embodiment, the prescribed value Sv is a fixed value. However, the present invention is not limited thereto. For example, the following change may be made. As illustrated in FIG. 5, the prescribed value Sv may be a load index L. The load index L is a variable that is set in accordance with a rotational speed ω of the rotating shaft 21 and that indicates a load applied to the helical teeth of the drive pulley 41 and the helical teeth of the toothed belt 43. A map illustrated in FIG. 5 is set such that the load index L increases as the rotational speed ω of the rotating shaft 21 increases.

The reason for this is that the higher the rotational speed ω of the rotating shaft 21 at the time of tooth skipping is, the greater the degree of wear (damage) between the helical teeth of the drive pulley 41 and the helical teeth of the toothed belt 43 is likely to be. Each time the determination circuit 51 determines occurrence of tooth skipping, the calculation circuit 52 retrieves the rotational speed ω of the rotating shaft 21, integrates the load index L used as the prescribed value Sv by referring to the map of FIG. 5, and calculates the integrated value representing the integrated load value. The damage accumulated in the drive pulley 41 of the transmission mechanism 40 and the toothed belt 43 can be determined based on the integrated value. Therefore, the degree of deterioration of the drive pulley 41 and the toothed belt 43 can be appropriately estimated. Note that the characteristics of the map of FIG. 5 may be appropriately changed, and a parameter different from the rotational speed ω of the rotating shaft 21 may be used as long as the parameter has correlation with the load index L indicating the load applied to the transmission mechanism 40.

In the present embodiment, the threshold Sth of the integrated value Sam is stored in the storage device 53. However, the threshold Sth of the integrated value Sam may be stored in the calculation circuit 52. That is, the threshold Sth of the integrated value Sam may be stored anywhere as long as the function of the control circuit is not lost in the control circuit.

In the present embodiment, the control circuit 50 includes the determination circuit 51, the calculation circuit 52, the storage device 53, and the notification instruction circuit 54. However, these circuits may be provided in the EPS system 1 as independent circuits.

In the present embodiment, the notification device 60 is a warning light. However, the notification device 60 may be a device, such as a speaker, that is mounted on the vehicle and outputs sound. The notification device 60 and the notification instruction circuit 54 of the control circuit 50 may be omitted.

In the present embodiment, the vehicle steering system is embodied as the EPS system 1. However, for example, the vehicle steering system may be applied to a steer-by-wire steering system. Further, the vehicle steering system may be applied to any vehicle steering system including a conversion mechanism, such as the transmission mechanism 40 of the present embodiment and the conversion mechanisms described in the modifications, whose components have parts that mesh with each other.

What is claimed is:

1. A vehicle steering system comprising:
   a steered shaft that reciprocates in an axial direction to steer steered wheels;
   a motor that generates power for reciprocating the steered shaft;
   a conversion mechanism that converts rotation of a rotating shaft of the motor into reciprocating motion of the steered shaft, the conversion mechanism including a drive pulley that rotates with the rotating shaft, a driven pulley rotatable about an axis of the steered shaft, and a toothed belt extending around the drive pulley and the driven pulley, and the conversion mechanism converts rotation of the rotating shaft into reciprocating motion of the steered shaft when rotation of the drive pulley is transmitted to the driven pulley via the toothed belt;
   a control circuit that controls power supply to the motor, the control circuit comprising;
   a determination circuit; and
   a calculation circuit,
   wherein the determination circuit determines whether tooth skipping that is a change in meshing position between the drive pulley and the toothed belt occurs, and
   the calculation circuit calculates an integrated value obtained by integrating a prescribed value indicating that the tooth skipping that is determined by the determination circuit occurs, and
   a threshold that is set for the integrated value and that indicates a degree of deterioration of the conversion mechanism is preset in a storage of the control circuit.

2. The vehicle steering system according to claim 1, wherein the prescribed value is a fixed value indicating a number of times tooth skipping is determined by the determination circuit.

3. The vehicle steering system according to claim 1, wherein the control circuit further includes a notification instruction circuit that instructs a notification device mounted on a vehicle to notify that the integrated value is greater than the threshold.

4. The vehicle steering system according to claim 1, wherein the tooth skipping is determined based on a rotational speed of the rotating shaft and a rotational acceleration of the rotating shaft.

5. The vehicle steering system according to claim 1, wherein the calculation circuit calculates the integrated value only when the determination circuit determines tooth skipping occurs two or more times.

6. The vehicle steering system according to claim 1, wherein the prescribed value is a fixed value other than 0.

7. The vehicle steering system according to claim 1, further comprising a sensor that detects displacement of the rotating shaft, and the determination circuit determines whether the tooth skipping occurs based on output from the sensor.

8. A vehicle steering system comprising:
   a steered shaft that reciprocates in an axial direction to steer steered wheels;
   a motor that generates power for reciprocating the steered shaft;
   a conversion mechanism that converts rotation of a rotating shaft of the motor into reciprocating motion of the steered shaft, the conversion mechanism including a drive pulley that rotates with the rotating shaft, a driven pulley rotatable about an axis of the steered shaft, and a toothed belt extending around the drive pulley and the driven pulley, and the conversion mechanism converts rotation of the rotating shaft into reciprocating motion of the steered shaft when rotation of the drive pulley is transmitted to the driven pulley via the toothed belt;
   a control circuit that controls power supply to the motor, the control circuit comprising;
   a determination circuit; and
   a calculation circuit,
   wherein the determination circuit determines whether tooth skipping that is a change in meshing position between the drive pulley and the toothed belt occurs, and the calculation circuit calculates an integrated value obtained by integrating a prescribed value indicating that the tooth skipping that is determined by the determination circuit occurs, and the prescribed value is a variable that is set in accordance with a rotational speed of the rotating shaft and that indicates a load applied to the conversion mechanism when tooth skipping is determined by the determination circuit.

9. The vehicle steering system according to claim 8, wherein the tooth skipping is determined based on a rotational speed of the rotating shaft and a rotational acceleration of the rotating shaft.

10. The vehicle steering system according to claim 8, wherein the calculation circuit calculates the integrated value only when the determination circuit determines tooth skipping occurs two or more times.

11. The vehicle steering system according to claim 8, wherein the prescribed value is a fixed value other than 0.

12. The vehicle steering system according to claim 8, further comprising a sensor that detects displacement of the rotating shaft, and the determination circuit determines whether the tooth skipping occurs based on output from the sensor.

\* \* \* \* \*